US007451648B2

(12) United States Patent
Brisson et al.

(10) Patent No.: US 7,451,648 B2
(45) Date of Patent: Nov. 18, 2008

(54) INTERNAL SENSOR WITH DISTURBING CURRENT REDUCED BY COMPENSATION BRANCHES

(75) Inventors: Raphaël Brisson, Asnieres sur Seine (FR); Paul Featonby, Newcastle-Upon-Tyne (GB)

(73) Assignee: Sagem Defense Securite, Paris (FR)

( * ) Notice: Subject to any disclaimer, the term of this patent is extended or adjusted under 35 U.S.C. 154(b) by 230 days.

(21) Appl. No.: 11/477,939

(22) Filed: Jun. 30, 2006

(65) Prior Publication Data

US 2007/0013364 A1 Jan. 18, 2007

(30) Foreign Application Priority Data

Jul. 4, 2005 (FR) .................................. 05 07069

(51) Int. Cl.
*G01P 15/10* (2006.01)
*G01P 15/08* (2006.01)

(52) U.S. Cl. ................................. 73/514.29; 73/862.59

(58) Field of Classification Search . 73/514.21–514.24, 73/514.36, 514.38, 514.37, 514.16, 514.29, 73/862.59

See application file for complete search history.

(56) References Cited

U.S. PATENT DOCUMENTS 5,501,103 A * 3/1996 Woodruff et al. ........ 73/514.29

| 6,453,744 | B2 * | 9/2002 | Williams ................. 73/504.12 |
| 6,484,578 | B2 * | 11/2002 | Woodruff et al. ......... 73/514.29 |
| 6,634,231 | B2 * | 10/2003 | Malametz ................. 73/514.01 |
| 6,904,803 | B2 * | 6/2005 | Baudry et al. ............ 73/514.29 |
| 6,948,368 | B2 * | 9/2005 | Onfroy ..................... 73/514.21 |

FOREIGN PATENT DOCUMENTS

| EP | 1 353 185 A2 | 10/2003 |
| EP | 1 450 164 A | 4/2004 |
| FR | 2 685 964 A | 7/1993 |

* cited by examiner

*Primary Examiner*—Helen C. Kwok
(74) *Attorney, Agent, or Firm*—Muncy, Geissler, Olds & Lowe, PLLC

(57) ABSTRACT

The inertial sensor comprises a piezoelectric plate having a vibrator member defined therein carrying excitation electrodes connected to an excitation circuit including conductor tracks carried by the piezoelectric plate the excitation circuit including a disturbing circuit portion in which the excitation circuit has compensation branches associated with corresponding disturbing conductor track portions, each compensation branch having one end connected to the corresponding disturbing conductor track portion and extending on a side of the midplane that is opposite from the side on which the corresponding disturbing conductor track portion extends.

7 Claims, 1 Drawing Sheet

INTERNAL SENSOR WITH DISTURBING CURRENT REDUCED BY COMPENSATION BRANCHES

The present invention relates to a piezoelectric inertial sensor.

BACKGROUND OF THE INVENTION

Inertial sensors are known, in particular from document FR-A-2 842 914, that are made from a piezoelectric quartz plate having formed therein by etching: a support member, a decoupling frame connected to the support member, and a vibrator member connected to a mass associated with the decoupling frame, the vibrator member carrying excitation electrodes connected to an excitation circuit including conductor tracks carried by the piezoelectric plate.

The excitation circuit is fed with alternating current (AC) leading, by the piezoelectric effect, to the vibrator member being set into vibration at a resonant frequency of vibration of said vibrator element. When the sensor is subjected to acceleration, the mass exerts a force on the vibrator element that modifies the frequency of vibration in such a manner that variation in the frequency of vibration of the vibrator element makes it possible to determine the acceleration to which the sensor is subjected.

Modification to the frequency of vibration is measured by measuring current in the excitation circuit.

Nevertheless, it has been found that when the sensor is subjected to a defined acceleration, the current as measured does not correspond exactly to the variation in the frequency of vibration of the vibrator element, with the current that is picked up including disturbing current that is added to the useful current in a manner that disturbs the useful information and that goes from as far as to saturate the electronics implemented in the sensor and thus to cause the accelerometer to malfunction.

OBJECT OF THE INVENTION

An object of the invention is to minimize the disturbing current that is superposed on the useful current.

SUMMARY OF THE INVENTION

According to the observation that forms part of the invention, it has been determined that the disturbing current is generated for the most part by disturbing portions of the excitation circuit in which two conductor tracks extend side by side on either side of a midplane of a plate portion that is subjected to deformation while the sensor is being subjected to acceleration. It has been found that charges of opposite signs then appear on either side of the midplane and are picked up by the closer conductor track such that said charges generate a disturbing current. Typically, in existing sensors, the conductor tracks have a width of 50 micrometers ($\mu m$).

According to the invention, compensation branches are provided in the disturbing circuit portions, the compensation branches being associated with corresponding disturbing conductor track portions, each compensation branch having one end connected to the corresponding disturbing conductor track portion and extending on a side of the midplane that is opposite from the side on which the corresponding disturbing conductor track portion extends. Thus, the compensation branch receives electric charge of sign opposite to that received by the corresponding disturbing conductor track portion, such that the charge picked up by the compensation branch cancels, at least in part, the charge picked up by the corresponding disturbing conductor track portion, so the disturbing current is thus reduced.

In advantageous aspects of the invention, the disturbing conductor track portions and the compensation branches extend parallel to each other and are connected in opposite directions, being interleaved between one another.

In another advantageous aspect of the invention, in the disturbing circuit portion, the disturbing conductor track portions are of width less than 50 $\mu m$, and preferably of width lying in the range 5 $\mu m$ to 20 $\mu m$. The initial disturbing current is thus reduced such that a low level of compensation suffices for eliminating the disturbing current.

BRIEF DESCRIPTION OF THE DRAWING

Other characteristics and advantages of the invention appear on reading the following description of a non-limiting particular embodiment of the invention, given with reference to the accompanying figures, in which.

DETAILED DESCRIPTION OF THE INVENTION

Figure 1:
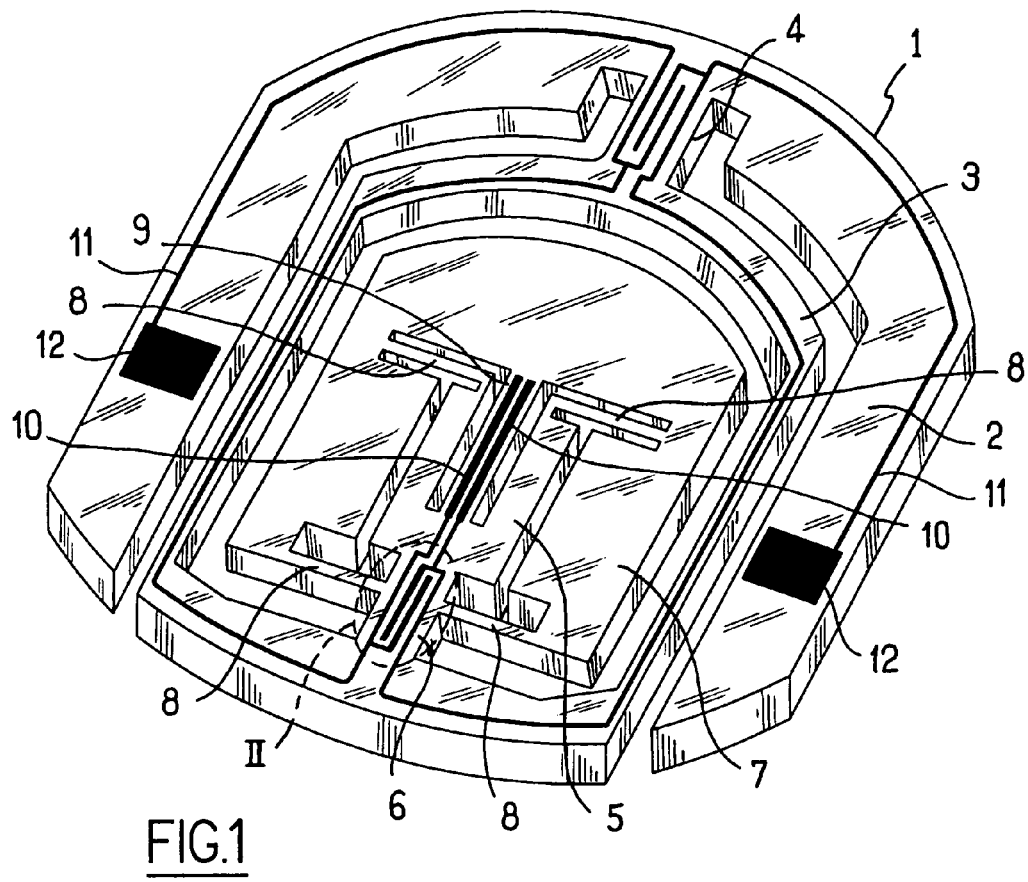
FIG. 1 is a perspective view larger than life size showing a preferred embodiment of the inertial sensor of the invention.

With reference to the figures, the sensor of the invention comprises in a manner known from the above-specified document, a piezoelectric quartz plate 1 having defined therein: a support member 2 for securing in a housing, a decoupling frame 3 having one side connected to the support member 2 via a bridge 4, and an opposite side connected to a first mass 5 via a bridge 6, a second mass 7 connected to the first mass 5 and to the bridge 6 by link elements 8, and a vibrator element 9 having ends secured to the masses 5 and 7, all of these elements being etching the piezoelectric plate 1.

Also in known manner, the vibrator member 9 has two excitation electrodes 10 connected to an excitation circuit comprising two conductor tracks 11 connected to power supply and measurement terminals 12. At the bridges 4 and 6, which are subjected to deformation when the sensor is subjected to acceleration, the excitation circuit includes circuit portions 13 where conductor track portions carrying overall reference 15 and particular references 15.1 and 15.2 extend beside each other on either side of a midplane M of the bridge.

Thus, as stated above, it has been found in the invention that the structure of these circuit portions generates a disturbing current.

According to the invention, in the disturbing circuit portions 13, compensation branches given overall reference 14 and particular references 14.1 and 14.2 are associated with the disturbing conductor track portions 15, each compensation branch 14 having one end connected to the corresponding disturbing conductor track portion 15 and extending parallel thereto on a side of the midplane M that is opposite from the side on which the corresponding disturbing conductor track portion extends.

Figure 2:
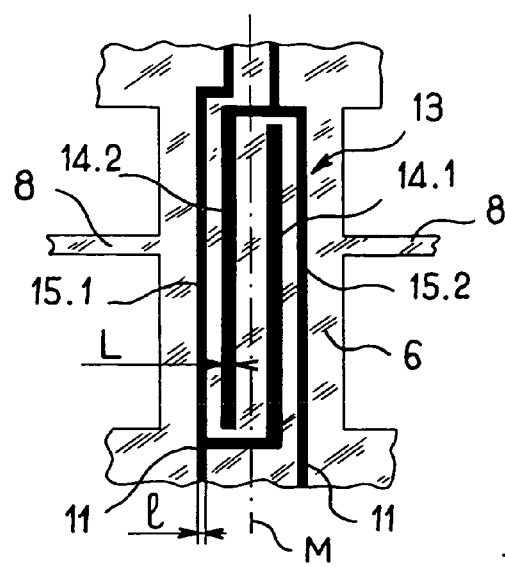
FIG. 2 is a fragmentary plan view on an even larger scale showing zone II of FIG. 1.

Preferably, as shown in FIG. 2, the compensation branches 14 are mounted in opposite directions and are interleaved in one another. In this context, it should be observed that the distance between each compensation branch and the midplane is slightly smaller than the distance between each corresponding disturbing conductor track portion and the midplane.

In order to fully compensate the disturbing current, the compensation branches are thus of a width L that is slightly greater than the width l of the corresponding disturbing conductor track portion in proportions that are a function of the effective distances between the midplane M and the compensation branch or the corresponding disturbing conductor track portion.

Preferably, in order to reduce the disturbing current that is to be compensated, the conductor track portions 15 are of a width l less than 50 µm, and preferably a width of 10 µm, or at any rate of a width lying in the range 5 µm to 20 µm.

Naturally, the invention is not restricted to the embodiments described and variants can be applied thereto without going beyond the ambit of the invention as defined by the claims.

In particular, the invention applies to any sensor in which the excitation circuit includes a disturbing circuit portion in which two conductor tracks extend beside each other on either side of a midplane of a plate portion that is subjected to deformation when the sensor is subjected to acceleration, regardless of the structure of the sensor elsewhere. By way of non-limiting example, the mass 5 may be totally integrated in the decoupling frame 3 such that the sensor then has only one disturbing circuit portion (on the bridge 4). The sensor could also have a first mass 5 directly connected to the support member. As in the preceding case, the sensor then has a single disturbing circuit portion. Conversely, the sensor could have a plurality of members associated in cascade, thereby multiplying the number of disturbing circuit portions.

What is claimed is:

1. An inertial sensor comprising a piezoelectric plate having defined therein a vibrator member carrying excitation electrodes connected to an excitation circuit comprising conductor tracks carried by the piezoelectric plate, the excitation circuit including a disturbing circuit portion in which two of the conductor tracks of the excitation circuit extend side by side and on either side of a midplane of a portion of the plate that is subjected to deformation when the sensor is subjected to acceleration, wherein, in the disturbing circuit portion, compensation branches are associated with corresponding disturbing conductor track portions, and wherein each compensation branch has one end connected to a corresponding disturbing conductor track portion and lies on a side of the midplane that is opposite from the side on which the disturbing conductor track portion lies.

2. A sensor according to claim 1, wherein the disturbing conductor track portions and the compensation branches extend parallel to one another.

3. A sensor according to claim 2, wherein the compensation branches are mounted in opposite directions and are interleaved in each other.

4. A sensor according to claim 1, wherein the compensation branch is of a width greater than the corresponding disturbing conductor track portion.

5. A sensor according to claim 1, wherein the disturbing conductor track portions are of a width of less than 50 µm.

6. A sensor according to claim 5, wherein the disturbing conductor track portions are of a width lying in the range 5 µm to 20 µm.

7. A sensor according to claim 6, wherein the disturbing conductor track portions are of a width equal to 10 µm.

* * * * *